Figure 1:
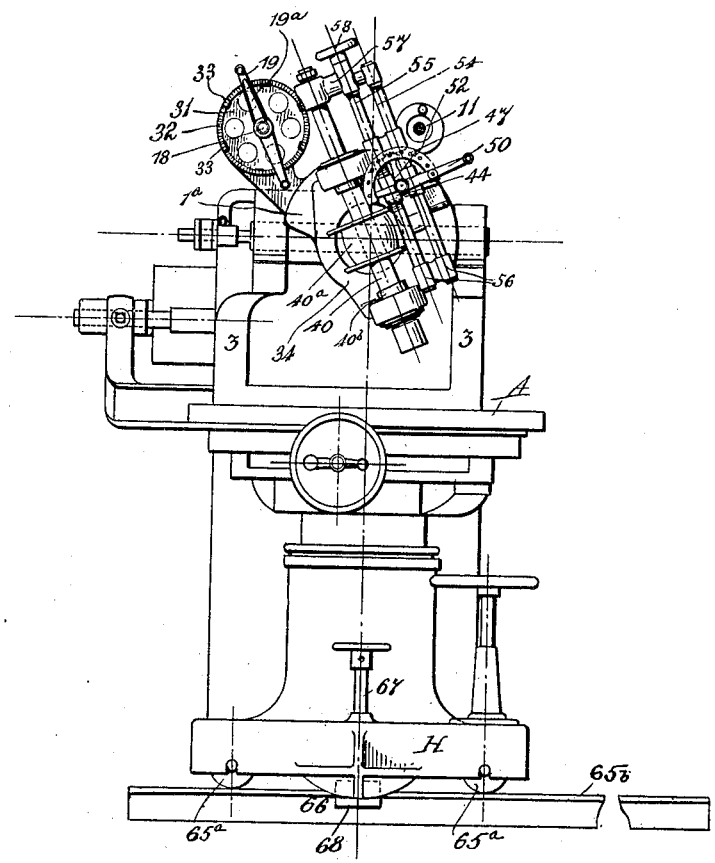

No. 885,408. PATENTED APR. 21, 1908.
J. W. WADKIN & D. J. JARVIS.
WOODWORKING MACHINE.
APPLICATION FILED DEC. 12, 1905. RENEWED SEPT. 14, 1907.

6 SHEETS—SHEET 1.

No. 885,408. PATENTED APR. 21, 1908.
J. W. WADKIN & D. J. JARVIS.
WOODWORKING MACHINE.
APPLICATION FILED DEC. 12, 1905. RENEWED SEPT. 14, 1907.

6 SHEETS—SHEET 2.

Joseph W. Wadkin and
Denzil J. Jarvis.
Inventors.

No. 885,408. PATENTED APR. 21, 1908.
J. W. WADKIN & D. J. JARVIS.
WOODWORKING MACHINE.
APPLICATION FILED DEC. 12, 1905. RENEWED SEPT. 14, 1907.

6 SHEETS—SHEET 3.

Joseph W. Wadkin,
Denzil J. Jarvis.
Inventors.

Witnesses:

By Marion & Marion
Attorneys.

No. 885,408. PATENTED APR. 21, 1908.
J. W. WADKIN & D. J. JARVIS.
WOODWORKING MACHINE.
APPLICATION FILED DEC. 12, 1905. RENEWED SEPT. 14, 1907.
6 SHEETS—SHEET 4.
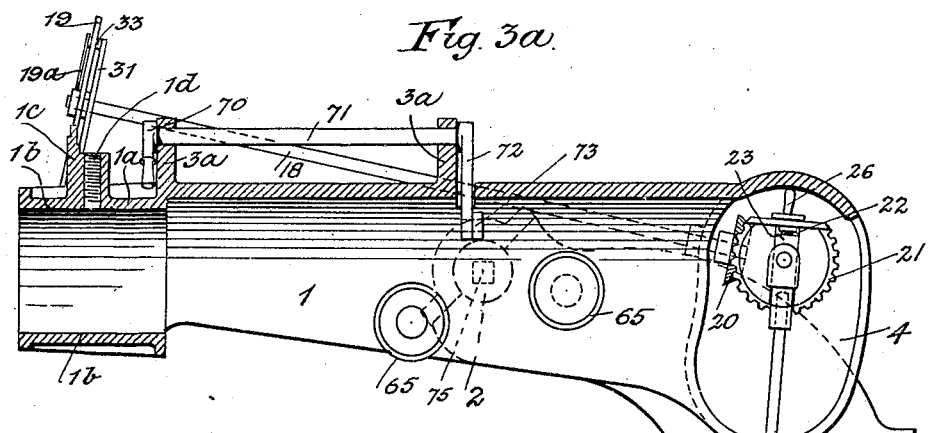
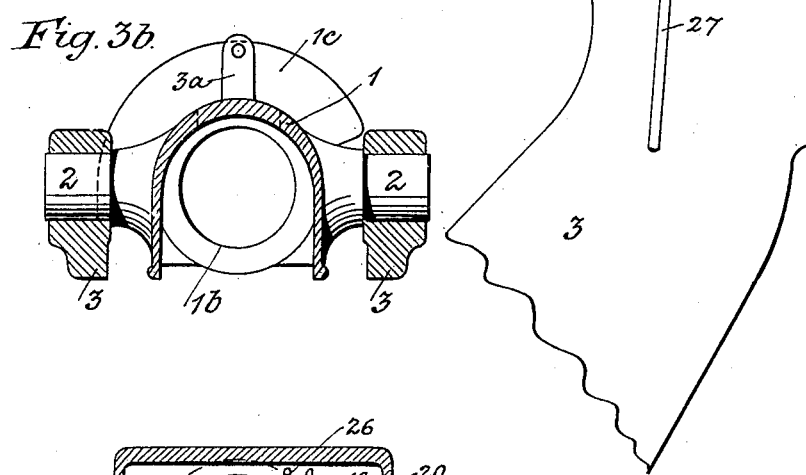
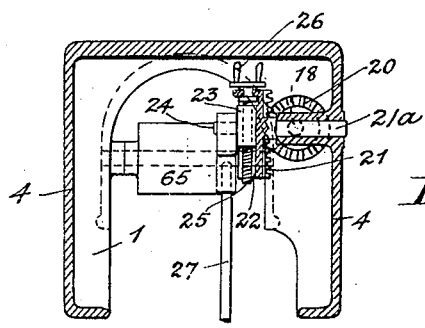

No. 885,408. PATENTED APR. 21, 1908.
J. W. WADKIN & D. J. JARVIS.
WOODWORKING MACHINE.
APPLICATION FILED DEC. 12, 1905. RENEWED SEPT. 14, 1907.
6 SHEETS—SHEET 5.
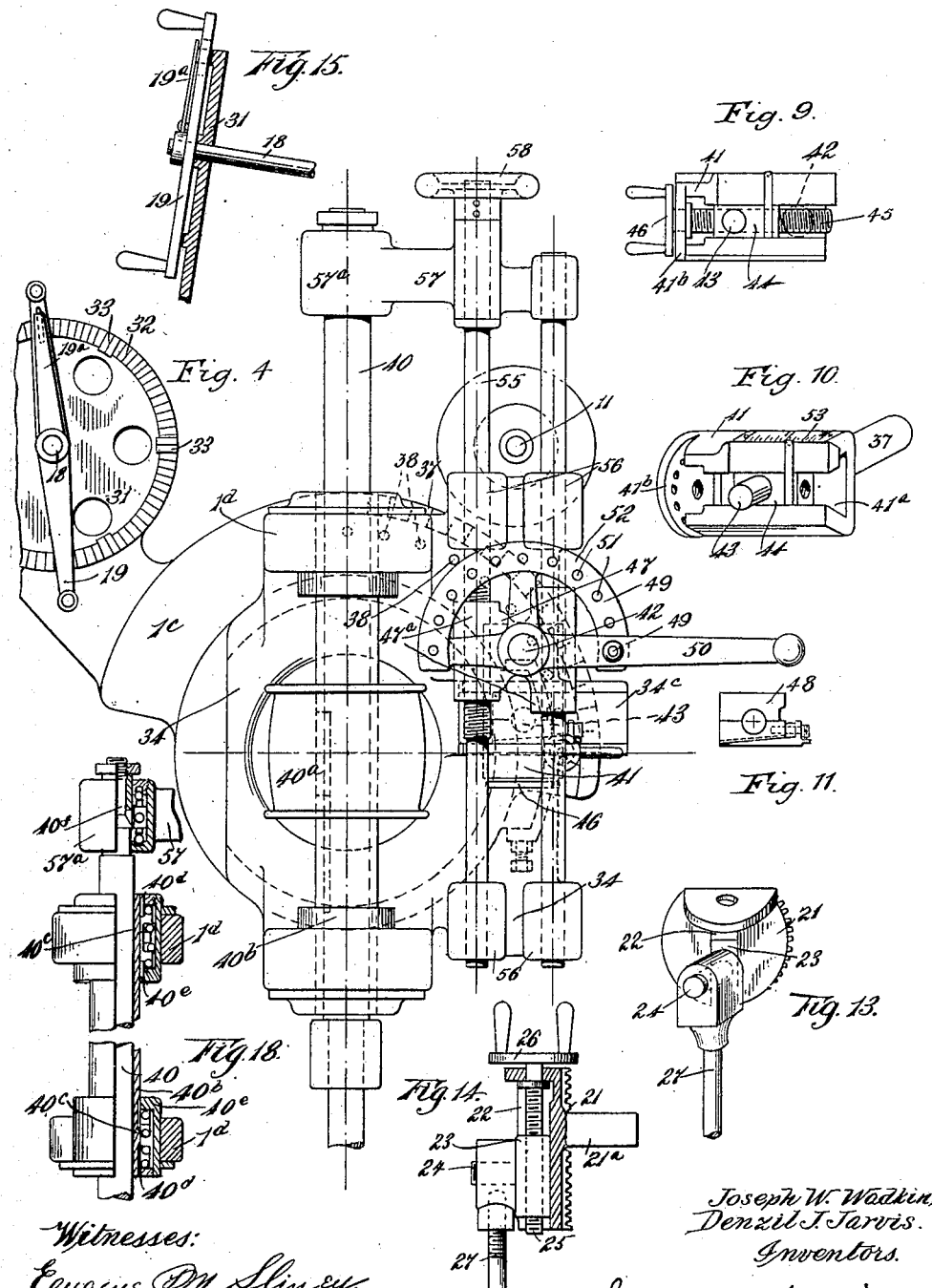

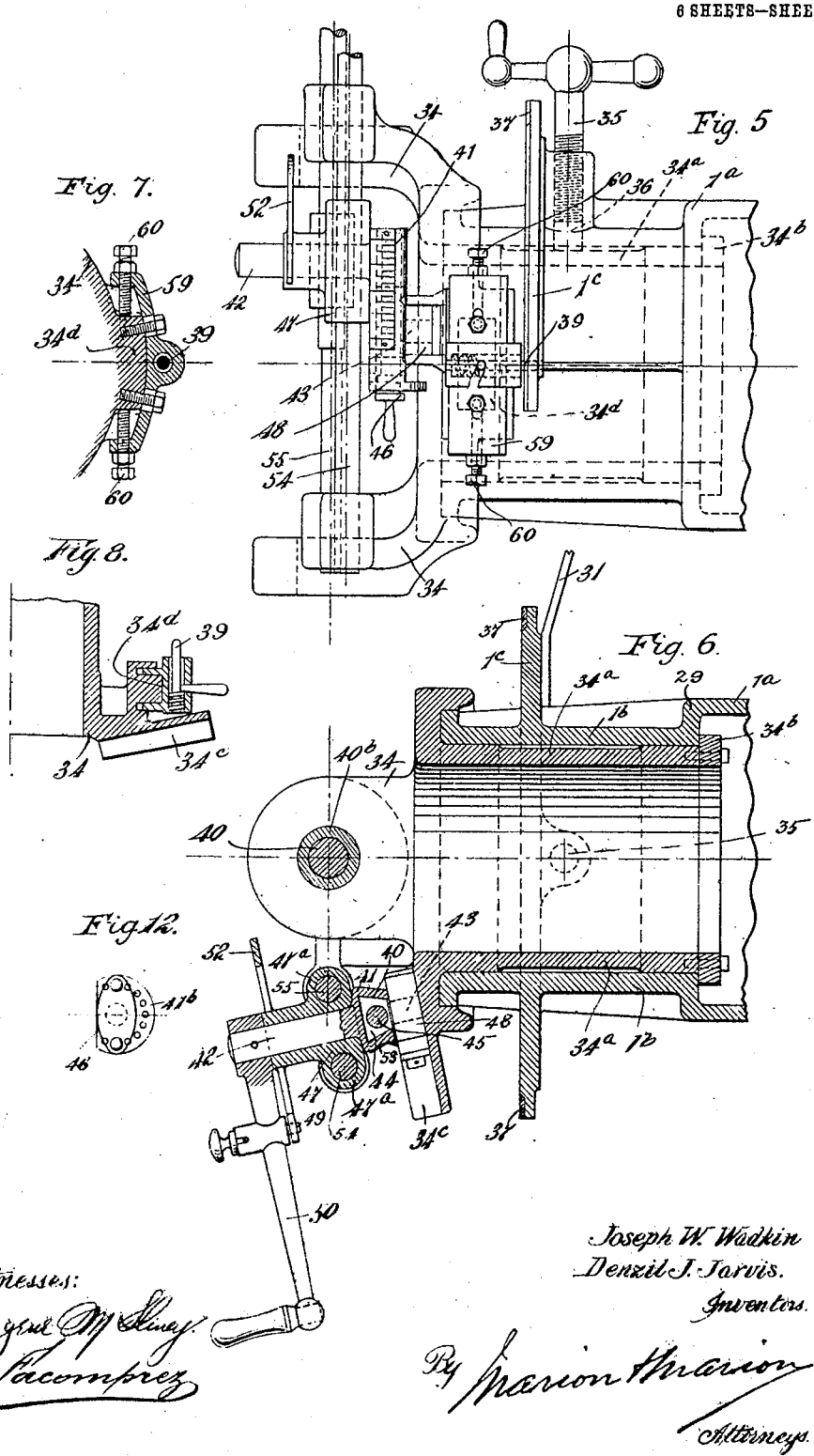

UNITED STATES PATENT OFFICE.

JOSEPH WILLIAM WADKIN AND DENZIL JOHN JARVIS, OF LEICESTER, ENGLAND.

WOODWORKING-MACHINE.

No. 885,408.  Specification of Letters Patent.  Patented April 21, 1908.

Application filed December 12, 1905, Serial No. 291,449. Renewed September 14, 1907. Serial No. 392,823.

*To all whom it may concern:*

Be it known that we, JOSEPH WILLIAM WADKIN and DENZIL JOHN JARVIS, subjects of the King of England, residing at Leicester, in the county of Leicester, England, have invented certain new and useful Improvements in Woodworking Machinery with Rotary Cutters; and we do hereby declare that the following is a full, clear, and exact description of the invention, such as will enable others skilled in the art to which it appertains to make and use the same.

The present invention relates to improvements in wood working machines in which the spindle is revoluble in the head of a rocking arm.

The present invention is designed with the object of improving the spindle head and the rocking arm on which it is carried; and of increasing the stability of the machine.

An important feature of the invention is an improvement effected in the spindle head, (which is revoluble in the head of the rocking arm), whereby the vertical movement of the spindle (relative to the spindle head) may be varied by a quick positive action, or by a slow action which, in addition, is a self-locking action; and furthermore, we provide improved means for adjusting the spindle head, should the spindle wear and get out of true, and we also provide ball bearings for the spindle.

We have also provided means for driving the spindle in either direction at the will of the operator, the motion of the spindle being reversed at any inclination of the spindle head arm, or at any angle of the spindle.

In conjunction with the aforesaid improvements, we provide a work supporting table, adjustable in any direction and movable bodily laterally on a platform, so that the center of the revolving part of the table may be moved from beneath the center of the spindle.

The said improvements are important features as they add considerably to the utility and durability of the machine in its practical application to every variety and range of work.

The invention will be clearly understood by the following further description, reference being made to the accompanying drawings, in which—

Figure 2:
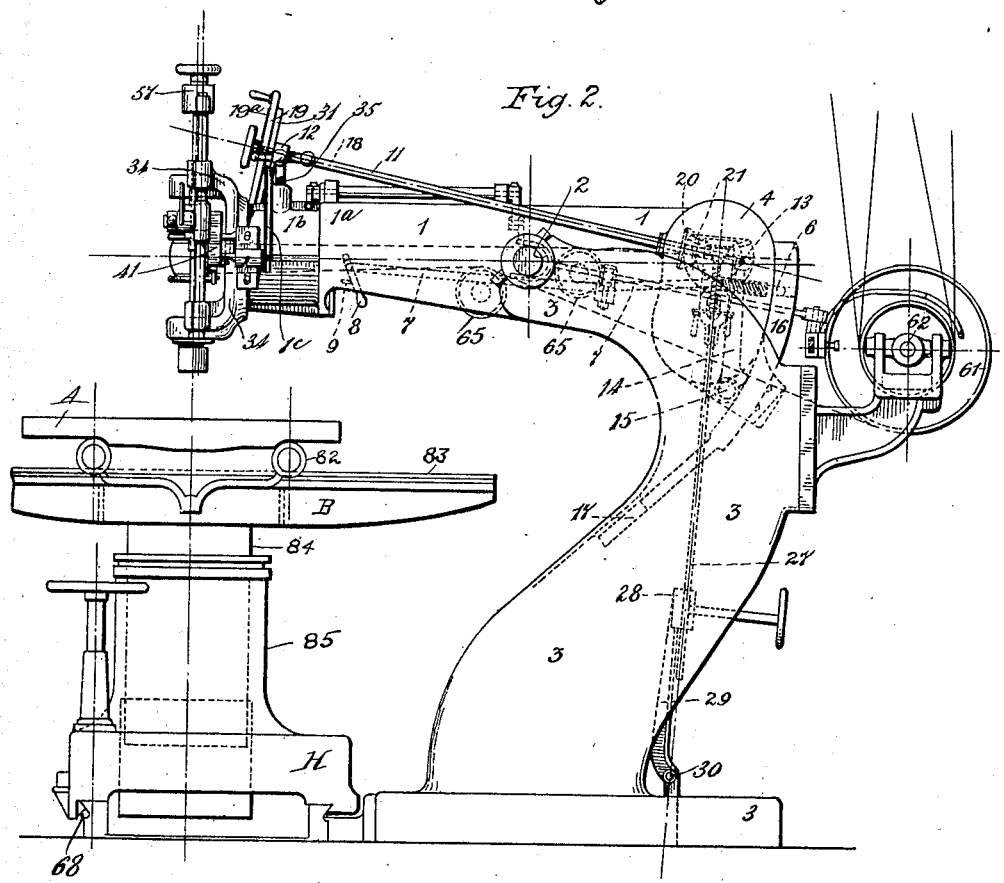
Figure 3:
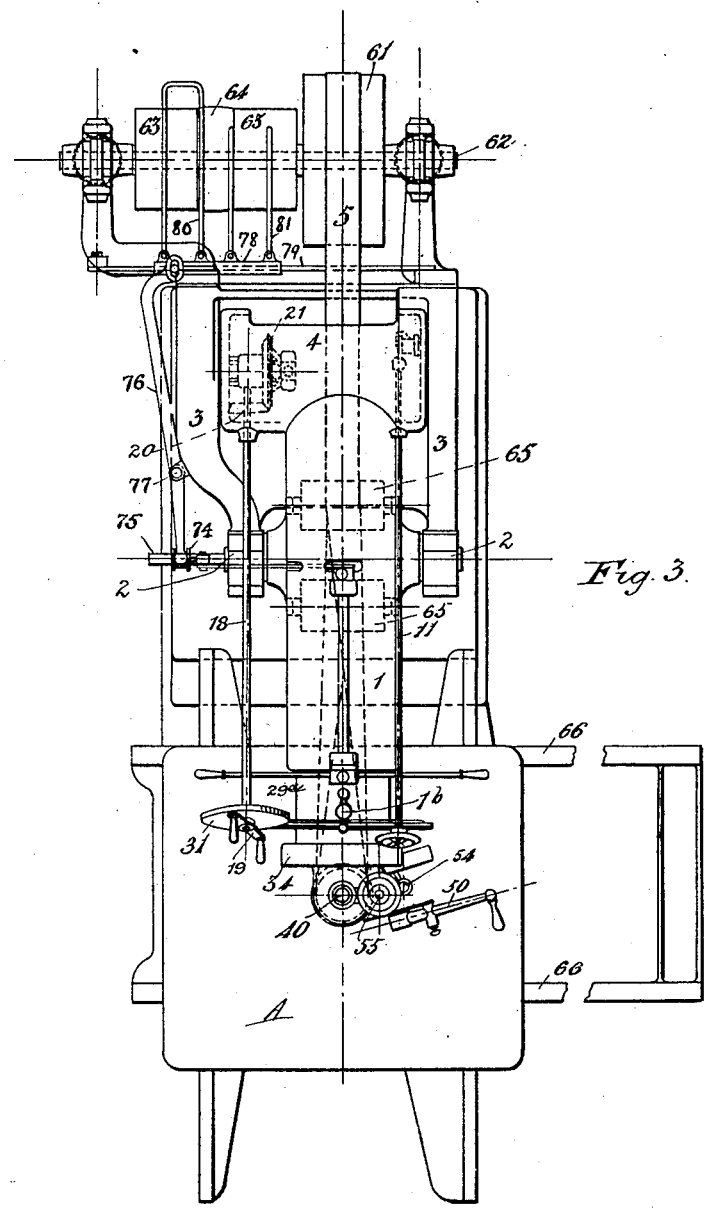

Figure 1 is a front elevation, Fig. 2 a side elevation, and Fig. 3 a plan of a wood working machine embodying our said improvements; Figs. $3^a$, $3^b$ and $3^c$ are sectional views, hereinafter referred to, of the arm; Fig. 4 is a front elevation of the spindle head showing the spindle and parts connected therewith; Fig. 5 is a side elevation of the spindle head and part of the spindle head arm; and Fig. 6 is a sectional plan thereof; Figs. 7 and 8 are sectional details; Figs. 9, 10, 11 and 12 are detail views of parts whereby a quick positive self-locking movement of the cutter spindle is obtained; and Figs. 13, 14, 15, 16, 17 and 18 are detail views hereinafter referred to.

Like reference characters refer to like parts throughout all the figures of the drawings.

The arm 1 carrying the cutter spindle head is supported about midway of its length on suitable trunnions 2, 2 carried in bearings formed on the main body 3 of the machine.

The arm 1 is arranged at 4 to act as a counter-balance, and at the same time affords room for the belt 5 which drives the spindle and the gear for moving the arm 1. The said part 4 is hollow and its rear end is formed on an arc concentric with the trunnions 2, 2, and the arm 1 being approximately centrally pivoted not only may be moved quickly, but the manner of pivoting conduces to the stability of the machine.

The arm 1 may be held at the dead horizontal position, as shown in Fig. 2, by means of a spring-controlled pin 6, connected by a rod 7, to a lever 8, pivoted in the arm 1. The said lever 8 may be held in its forward position to disengage the pin 6 from an arc-piece 16 hereinafter mentioned, by means of a catch-piece 9 attached to the arm 1, but as soon as the lever 8 is disengaged from said catch-piece, the pin 6 is forced rearward by the spring 10 into an opening in the arc-piece and holds the arm 1 in the dead horizontal position. When the pin 6 is withdrawn clear of the arc-piece 16, the arm 1 may be freely rocked on the trunnions 2, 2 or may be secured at any desired inclination by means of the following clamping mechanism:—A rod 11, screw threaded into a bracket 12, which is fixed on an arc-shaped extension $1^c$ on the arm 1, extends from the front thereof into the rear part 4 and is suitably jointed at 13 with the free upper end of a cam-lever 14, which latter is pivoted at 15 on the arm 1. The radial arc-piece 16 is screwed at 17 to the body 3 of the machine, and as the rod 11 is turned, it moves the lever 14 on its pivot and causes a cam 14ᵃ to impinge against the arc-piece 16 to clamp the arm 1 in its adjusted position.

By providing means for positively locking the arm 1 on the dead horizontal plane as well as means for locking the said arm 1 at any desired inclination, the operator is enabled to readily manipulate the spindle head when placing work in position on the table A.

The arm 1 may have a positive or definitely restricted amount of self locking swinging movement imparted to it at the will of the operator by the following means:—A rod 18, suitably carried on the arm 1, extends from the front to the rear thereof, and has fixed on its front end a double crank 19. On the rear end of the rod 18 is fixed a bevel gear 20 and the latter drives another gear 21, journaled at 21ᵃ in the part 4 of the arm 1.

The gear 21 is slotted at 22 to receive therein a block 23, provided with a pin 24. The said block 23 is adapted to receive therethrough the adjusting screw 25, which may be turned by means of a handle 26, to adjust the pin 24 relatively to the journal 21ᵃ of the gear 21.

The pin 24 may be locked on its dead center by means of a rod 27, the lower end of which depends and is clamped in the jaw 28 of an arm 29, pivoted at 30, to the frame 3. For some operations, it is desirable to rapidly and repeatedly vary the height of the spindle head in relation to the work supporting table A, and this may be effected by withdrawing the pin 6 from the arc-piece 16, next clamping the rod 27 in the jaw 28, and then by turning the crank 19, the gear 21 may be turned a complete half-turn (when it is self-locking) and the spindle head will synchronously be raised or lowered to just double the distance the pin 24 is offset from the journal 21ᵃ of the gear 21, (see Figs. 13 and 14), this movement being the "stroke" of the spindle head. It will be found desirable at times, to lower the spindle head at successive, or alternate, operations, a less distance than the stroke to which it is set, and to do this conveniently, a disk 31 is provided having an index 32 thereon, the said disk being provided with suitable stops 33, 33, which may be adjustably clamped on the face of the disk 31 to regulate the movement of the crank 19 as it is turned by the operator. The said crank 19 is provided with a suitable spring catch 19ᵃ to engage the stops 33, 33. The gear 21 may be turned 180° or less to regulate the depth of cut. This action is particularly desirable for many operations carried out by the machine, and adds largely to the efficiency and value thereof.

The spindle head 34, which is rotatably mounted in a reduced portion 1ᵇ of the arm 1, has a barrel 34ᵃ extending therefrom into the reduced portion 1ᵇ of the said arm, and the said barrel has a plate 34ᵇ suitably fixed thereto so as to maintain the head 34 in its lateral position, and in addition it may be secured from turning by means of the set screw 35 screwed into a hole 1ᵃ and bearing upon the block 36 (see Figs. 3ᵃ and 5), which is thereby forced down on to the barrel 34ᵃ. The portion 1ᵇ of the arm 1 is provided with an arc-shaped extension 1ᶜ on which is fixed an index 37 (see Figs. 4, 5 and 6) and at each division of said index, there is a hole 38, in the plate 1ᶜ, into which a spring-controlled index pin 39 may enter to hold the spindle head 34 at any desired angle, as in Fig. 1.

In the present invention, the cutter spindle 40 may be moved relatively to the head 34, either with a quick positive self-locking movement, or with a slow-self-locking movement. The quick positive movement of the spindle 40 is attained by means of a crank action, as before mentioned, which is variable at the will of the operator. The said improvement is effected by means of a crank 41 provided with a spindle 42, the said crank being also provided with a crank pin 43 integral with a die-block 44, which latter is dovetailed into a slot 41ᵃ in the crank 41, and adjustable therein by means of a screw 45 operated by means of a plate handle 46 or equivalent, the said screw 45 passing through the head 41ᵇ of the crank 41.

The crank spindle 42 passes through the body of a bracket 47. The crank pin 43 engages with a sliding die-block 48 moving at right angles to the axis of the spindle 40, in a slide 34ᶜ, formed with the head 34.

A spring-controlled pin 49 carried in the crank 50 is normally pressed outward to enter one of a series of holes 51, 51, in the quadrant 52 to maintain the positive position of the crank pin 43 at any point intermediate of the full throw the crank 41 is adjusted to, thereby providing means for a definite setting of depth of cut. This is an important feature, the operator being enabled thereby to set the crank pin 43 by means of an index 53 on the crank 41, and so regulate the full depth of cut for any operation, and he is enabled moreover to quickly subdivide the depth of cut at will.

The die block 48, as seen clearly in Fig. 11, is specially designed for taking up the wear necessarily entailed by acting as the fulcrum of movement of the crank 41.

It will be apparent from the foregoing description, that the spindle 40 may be rapidly lowered or raised by rotating the crank 50.

In addition to the quick positive self-locking action of the crank 41 described, a slow movement essential for setting work to a minute accuracy may be imparted to the spindle 40. Integral with the bracket 47 there are formed two bosses 47ᵃ, 47ᵃ, through which pass guide rods 54, 55, arranged parallel with the spindle 40, the said rods 54, 55 also passing through guides 56, 56, formed preferably integral with the revolving head 34, the said rods 54 and 55 and the spindle 40 being connected by a crosshead 57, and so movable together.

The rod 55, nearest the spindle 40, is provided with a hand-wheel 58 and is screw-threaded near its center to pass into a boss of the bracket 47, and on said rod 55 being turned it will move it and the spindle 40 to any degree of accuracy required.

Should the spindle 40 get out of true with the spindle head 34, a ready adjustment of the parts may be effected as follows:—On the periphery of part of the head 34 is mounted an arc shaped block 59 in which is carried the index pin 39. The said block 59 is adjusted round on a projection 34$^d$ on the periphery of the revolving head 34, by means of the set screws 60, 60 at each end of the block.

The spindle 40 is driven by means of the belt 5, before mentioned, which passes round a pulley 40$^a$, secured on the sleeve 40$^b$, which is so keyed to the spindle 40 as to allow free traverse of the latter therein.

The belt 5 before mentioned passes round a pulley 61 fixed on a countershaft 62, and on the latter are also mounted two loose pulleys 63, 63 and a fixed pulley 64. The two loose pulleys 63, 63 are driven in opposite directions by belts from any suitable source of power, and either belt may be moved on to the fixed pulley 64, by the striking mechanism illustrated in Figs. 3 and 3$^a$. The said mechanism consists of a crank 70 fixed on the forward end of a shaft 71, carried in lugs 3$^a$, 3$^a$ on the arm 1, and on the rear end of the said shaft, is fixed a lever 72 to which is pivoted a rod 73, suitably connected to a thrust collar 74 slidable along a square rod 75 fixed in a trunnion 2. The lever 76, which is fulcrumed at 77 to the body 3 of the machine, has on its rear end a sleeve 78, slidable along the fixed rod 79 and on said sleeve are fixed the belt forks 80 and 81. As shown in Fig. 3, the said two forks guide the belts (not shown) on the two loose pulleys 63, 63, but it will be seen that a movement of the crank 70 will readily impart a movement to the forks 80 and 81 and carry either belt as required on to the fixed pulley 64. By the arrangement of parts described and illustrated, the operator may instantly reverse the motion of the spindle 40 at any position of the latter, and without having to alter the inclination of any of the parts. The belt 5 passes from the pulley 61 and over guide pulleys 65, 65, mounted radially with the trunnions 2, 2 and so arranged as to keep the belt 5 taut and compensate for the radial movement of the cutter spindle 40 in relation to the countershaft 62.

We may arrange for a motor in place of the counter-shaft and loose pulleys and drive from off the motor direct, and in lieu of the two loose pulleys and the fixed pulley before mentioned, reverse the motor for driving the spindle in either direction, as required.

The work supporting table consists of an upper portion A mounted on wheels 82. A lower portion B carries a track 83 on which the wheels 82 are guided. The part B is mounted on the end of a plunger 83 which may be raised or lowered by any suitable mechanism, such as hydraulic means, into a supporting casing 84 having an integral base H as clearly seen in Fig. 2 of the drawing. The base H is mounted on wheels 65$^a$ supported on a track 65$^b$ on a foundation frame. This track runs at right angles to the track 83.

It will be readily seen that the above construction provides a means of moving the work in any direction relative to the spindle head.

Having thus described my invention, what I claim and desire to secure by Letters Patent is:

1. In a wood working machine, the combination of a main body portion, a counterbalanced arm pivoted for vertical swing thereon, a head rotatably mounted on said arm, a revoluble cutter spindle carried by said head, means for locking said arm in the several positions of its vertical swing, means for locking said head in its several rotated positions, means for adjusting said spindle longitudinally, and a work supporting table constructed to provide universal movement for the work thereon, substantially as described.

2. In a wood working machine, the combination of a main body portion, a counterbalanced arm pivoted for vertical swing thereon, a manually operated rod journaled on said arm, a drive gear secured to said rod, a driven gear journaled on said arm in mesh with said drive gear, a crank block radially adjustable on said driven gear, a rod pivoted to said crank block and to said main body portion, a head rotatably mounted on said arm, means for locking said head in its several rotated positions, a revoluble cutter spindle carried by said head, and means for adjusting said spindle longitudinally, substantially as described.

3. In a wood working machine, the combination of a main body portion, a counterbalanced arm pivoted for vertical swing thereon, a head rotatably mounted on said arm, a revoluble cutter spindle carried by said head means for locking said arm in several positions of its vertical swing, other means for imparting to the arm a definitely restricted swinging movement, means for rotating said head and locking it in different positions with respect to said arm, means for adjusting said spindle longitudinally, and other means for imparting to said spindle a definitely restricted longitudinal movement, substantially as described.

4. In a wood working machine, the combination of a main body portion having an arc-shaped extension, an arm pivoted thereon provided with an extension and having at one end an enlarged portion forming a counterbalance and at the other a rotatably mounted head, a revoluble cutter spindle carried by said head, means for imparting to said arm a definitely restricted vertical swinging movement, said means comprising a rod having a threaded portion in engagement with the extension on said arm, a pivoted lever connected with said rod and provided with a cam portion adapted to engage the arc-shaped extension on said main body, means for rotating said head, and means for adjusting said spindle longitudinally, substantially as described.

5. In a wood working machine, the combination of a main body portion, a counterbalanced arm pivoted thereon and provided with a rotatably mounted head having a slot, a revoluble cutter spindle carried by said head, means for imparting to said spindle a definitely restricted longitudinal movement, said means comprising a bracket, a plurality of rods parallel to said spindle and connected therewith passing through the bracket and secured thereto, an adjustable crank mechanism carried by said bracket, and a block adapted to slide in the slot in said head in engagement with said crank mechanism, substantially as described.

6. In a wood working machine, the combination of a main body portion, a counterbalanced arm pivoted for vertical swing thereon, a head rotatably mounted on said arm, means for locking said head in its several rotated positions, said means comprising a set screw positioned in said arm, a block engaged by said set screw and bearing on said head, a semi-circular plate carried on said arm provided with openings, a spring controlled pin carried by said head and adapted to enter said openings, and a cutter spindle carried by said head, substantially as described.

In witness whereof we have hereunto set our hands in the presence of two witnesses.

JOSEPH WILLIAM WADKIN.
DENZIL JOHN JARVIS.

Witnesses:
T. S. SHOULER,
H. F. WOODWARD.